United States Patent [19]
Scarborough

[11] Patent Number: 5,992,033
[45] Date of Patent: Nov. 30, 1999

[54] SHOCK ABSORBING, EASILY CALIBRATED VIAL SYSTEM FOR A CARPENTER'S LEVEL

[76] Inventor: Dane Scarborough, P.O. Box 3351, Hailey, Id. 83333

[21] Appl. No.: 08/840,793

[22] Filed: Apr. 16, 1997

[51] Int. Cl.⁶ .................................................. G01C 9/00
[52] U.S. Cl. ............................................... 33/384; 33/385
[58] Field of Search ........................... 33/384, 385–388, 33/389, 379, 372–375

[56] References Cited

U.S. PATENT DOCUMENTS

| | | | |
|---|---|---|---|
| 662,991 | 12/1900 | Van Luvan | 33/375 |
| 676,330 | 6/1901 | Lemle | 33/384 |
| 778,130 | 12/1904 | James | 33/385 |
| 808,862 | 1/1906 | McCain | 33/387 |
| 935,807 | 10/1909 | Oswald | 33/383 |
| 1,012,668 | 12/1911 | Lofberg | 33/385 |
| 1,298,024 | 3/1919 | Ellison | 33/384 |
| 2,487,245 | 11/1949 | Hubbard | 33/214 |
| 2,692,440 | 10/1954 | Walters | 33/383 |
| 2,906,032 | 9/1959 | Holderer | 33/387 |
| 3,947,970 | 4/1976 | Lesure | 33/375 |
| 4,130,943 | 12/1978 | Talbot | 33/374 |
| 4,471,535 | 9/1984 | Ufrovich et al. | 33/387 |
| 4,590,682 | 5/1986 | Koch | 33/383 |
| 4,663,856 | 5/1987 | Hall et al. | 33/373 |
| 4,774,767 | 10/1988 | Scheyer | 33/388 |
| 4,860,459 | 8/1989 | Dengler | 33/379 |
| 4,999,921 | 3/1991 | Bird et al. | 33/388 |
| 5,111,589 | 5/1992 | Tate | 33/385 |
| 5,177,873 | 1/1993 | Tate | 33/385 |

*Primary Examiner*—Diego Gutierrez
*Assistant Examiner*—Quyen Doan
*Attorney, Agent, or Firm*—Patent Law & Venture Group; Gene Scott

[57] ABSTRACT

A carpenter's level provides a three point mounting for a vial housing within a level frame. The frame is a square cylinder, preferably an extruded part. The vial housing mounts within the frame on a pivot pin and is biased by a spring toward one side wall of the frame where the vial housing abuts the side wall on a pivot ridge extending from the housing. The pivot pin provides a camming surface so that the vial housing may be rocked slightly to a new position in order to re-align the vial housing within the frame.

14 Claims, 2 Drawing Sheets

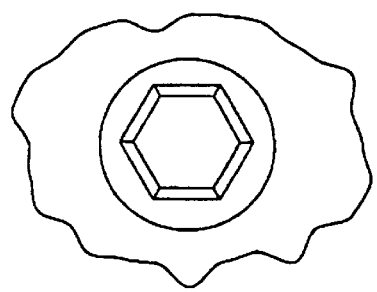
FIG. 3
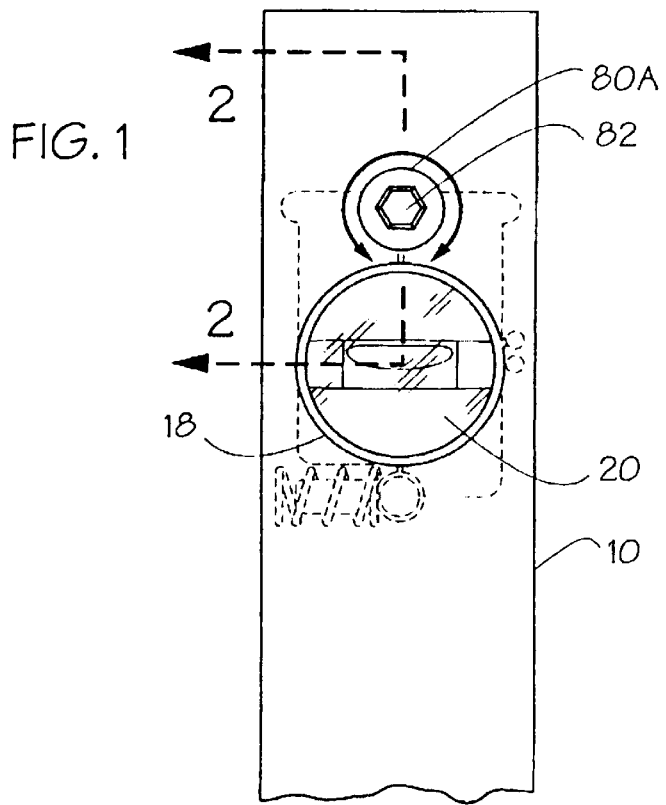
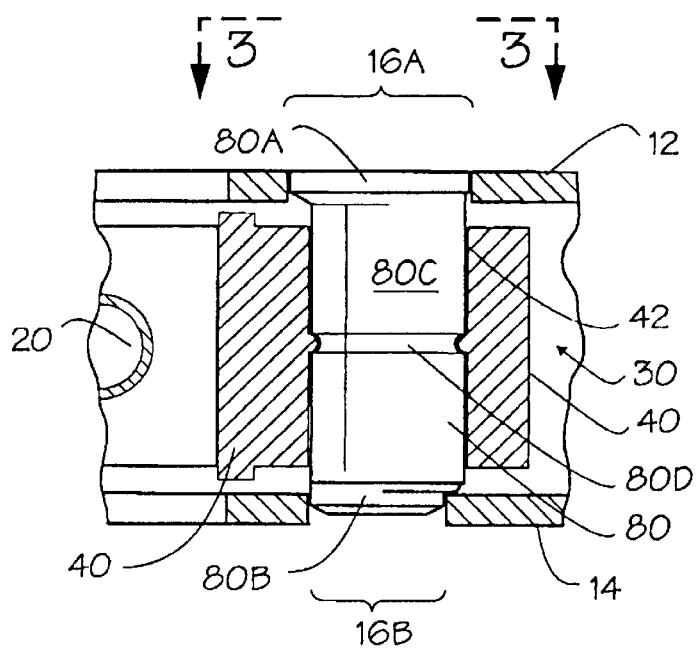

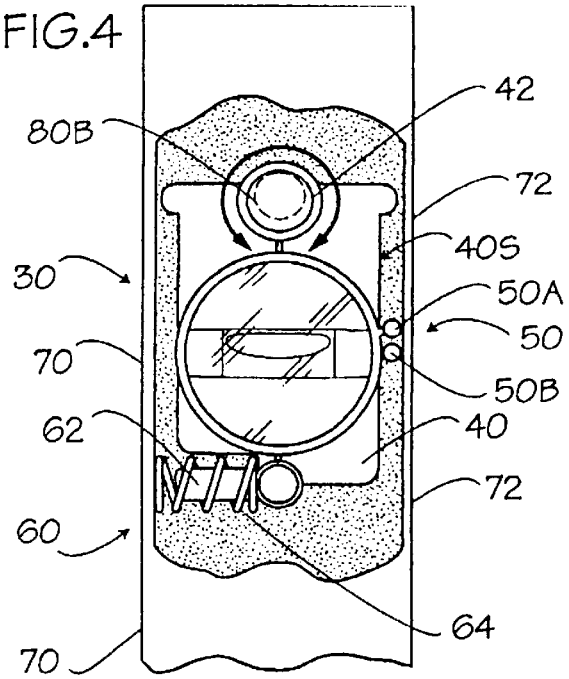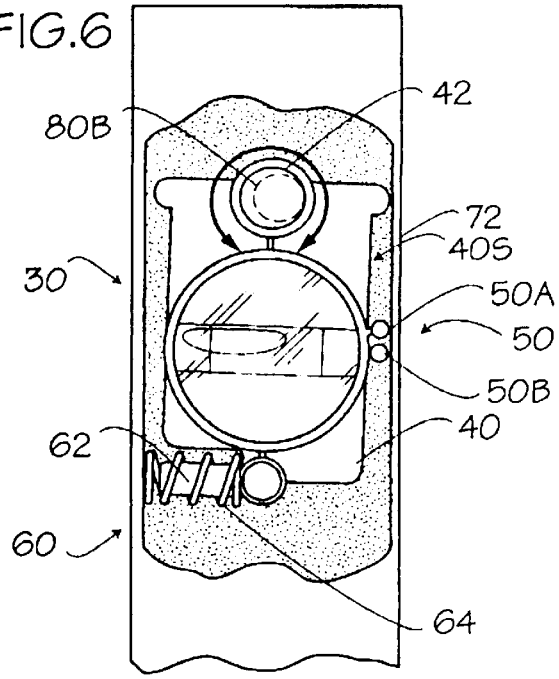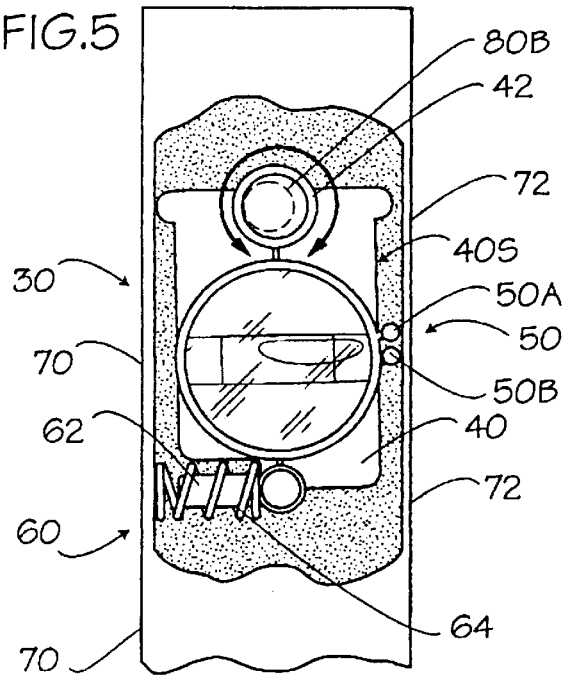

SHOCK ABSORBING, EASILY CALIBRATED VIAL SYSTEM FOR A CARPENTER'S LEVEL

BACKGROUND OF THE INVENTION

1. Field of the Invention

The invention relates generally to carpenters' tools, and, more particularly, is directed to a carpenter's level having a means for quickly and accurately calibrating a bubble vial within the device.

2. Description of Related Art

The related art is described as follows:

Lemile, U.S. Pat. No. 676,330 describes improvements in the construction of spirit-levels, more especially the manner of mounting the level or glass or vial, and to enable the latter to be readily adjusted vertically from the exterior and to cushion the same.

James, U.S. Pat. No. 778,130 describes improvements in spirit levels, and the object is to provide an improved construction of spirit-level having simple and effective means for attaching the liquid-tube to the support and conveniently adjusting the same.

McCain, U.S. Pat. No. 808,862 relates to leveling and plumbing instruments, and it consists of a chambered bar provided with a pivoted spirit-level and a shaft and cam for adjusting the same to an extent indicated by a pointer on the shaft.

Oswald, U.S. Pat. No. 935,807 describes an improvement in the construction of spirit level attachments, and to provide a simple, inexpensive and efficient device of this character capable of ready adjustment to arrange the bubble tubes in proper position with relation to the instrument, and adapted to permit a bubble tube to be readily removed and replaced by a new tube, should the bubble tube be broken or otherwise impaired through rough handling of the instrument.

Lofberg, U.S. Pat. No. 1,012,668 describes improvements in levels and has for its object the provision of an improved level of simple construction and efficient operation.

Ellison, U.S. Pat. No. 1,298,024 describes a spirit level which may be easily and readily applied to or detached from a level-stock, so that bricklayers, masons, or other artisans who use such leveling instruments may carry the spirit level to and from their work and apply the same to any suitable level-stock.

Hubbard, U.S. Pat. No. 2,487,245 relates to a level of the type used by carpenters, bricklayers, and other workmen erecting buildings and other structures which must be kept perpendicularly and horizontally accurate. If such levels are not carefully handled the casings or rings holding bubble glasses are liable to move out of their proper positions and the level will not be accurate.

Scheyer, U.S. Pat. No. 4,774,767 describes a water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural parts connected to the level body. The rotatable water level member has at least one circumferentially extending flange which engages under a clamping jaw. The clamping jaw can be pressed against the surface of the flange by means of a manually operated clamping member.

Dengler, U.S. Pat. No. 4,860,459 describes a bubble level with a hollow metal section that has a circular window, in which a cylindrical level tube for a vertical level can be inserted with a positive interlock in the axial direction and can be fastened with a material interlock. A level support is inserted into the hollow section in the axial direction. The support has a cylindrical seat aligned with the window, to receive a level holder that bears a level. An interlock device is disposed between the level support and the level holder. By means of this interlock device, the level holder is mounted axially fixed, but rotatable until it is fastened by the material interlock.

Bird et al, U.S. Pat. No. 4,999,921 describes an adjustable spirit level having a plurality of spirit levels therein. A first spirit level measures vertical orientation, a second adjustable spirit level is adjustable to a true horizontal position, and a third spirit level is adjustable to any desired position between vertical and horizontal. The second level may be adjusted with a rotatable cam-shaped end piece secured within the level body, while the third level is ratcheted to a predetermined angle. The third level may be held in place by a spring member biasing the level against the level body.

Tate, U.S. Pat. No. 5,111,589 describes an adjustable plumb level formed from an I beam with wood side panels. A circular hole is formed through the I beam and side panels, within which an indicating mechanism is disposed. The indicating mechanism is easily replaceable so that the present invention can be used as a plumb or a level.

Tate, U.S. Pat. No. 5,177,873 describes an adjustable plumb level having a first gear driven by a second gear. The second gear has a smaller external diameter than does said first gear. The second gear is operatively coupled to first gear so that when an external force causes the second gear to rotate, the first gear also rotates. The first gear includes a straight vial disposed in the center thereof.

The prior art teaches the use of an adjustable vial and of a means for adjustment of the vial position in order to calibrate the leveling device. However, the use of a spring loaded biasing means is not taught and the mounting of a vial so as to pivot about a third point of contact between the vial and the leveling frame appears to be novel in the art. There is a need for a general purpose leveling tool that is able to sustain the physical shocks encountered in normal use as well as the occasional severe shocks encountered under unusual circumstances such as when the tool is dropped. There is a need for a leveling tool that is able to be easily and quickly calibrated as required. The present invention fulfills these needs and provides further related advantages.

SUMMARY OF THE INVENTION

The present invention is a level and plumb indicating device, and more generally, one for indicating the orientation of a surface. The device provides a novel construction so as to be able to maintain alignment between a bubble vial and the leveling frame structure. A box cylindrical frame houses a bubble level held in a housing which is supported within the box frame at three points. First, the housing is supported rotationally on a cam pin so that the bubble may be positioned at will over a range of motion about the cam pin. Second, the housing is engaged by a biasing device to move in a preferred direction about the cam pin. Third, the housing provides a pivot point upon which the housing sits against the inside of the frame due to the pressure exerted by the biasing device. At any time the housing is therefore supported within the housing at three points; the cam pin, the bias device and the pivot point. When the bubble vial must be adjusted to align the vial with the leveling frame it is easily rotated by engaging the cam pin.

Therefore it is one capacity of the present invention to provide an accurate means for indicating level or plumb surfaces in that the frame of the device is aligned with a bubble vial so that with the frame in contact with a flat surface a bubble within the bubble vial is aligned between a pair of spaced apart alignment lines on the bubble vial in such manner as to enable a skilled craftsman to read when the flat surface is in a plumb or level condition.

It is another capacity of the present invention to provide such a means for indicating level or plumb surfaces where the alignment of the vial and the frame of the device is manually adjustable so as to eliminate any error in the device.

It is a further capacity of the present invention to provide such a means for indicating level or plumb surfaces where the alignment of the vial and the frame of the device is manually adjustable through the use of an eccentric rotating surface.

It is yet a further capacity of the present invention to provide such a means for indicating level or plumb surfaces where the vial is held within the frame of the device by three points of contact, a rotational cam pin, a pivot ridge on the vial housing, and a biasing means forcing the vial housing to press the pivot ridge against the frame. Because two of the three points are contacts only with no engagement, there are few surfaces to wear, no chance for parts to become loose in their sockets, etc. This provides a distinct advantage over the prior art in that the assembly is able to withstand greater mechanical shocks without becoming misaligned Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a plan view of the present invention showing a box frame of the invention with a leveling device within the frame;

FIG. 2 is a partial elevational view taken along line 2—2 of FIG. 1;

FIG. 3 is plan view taken in the direction shown by line 3—3 in FIG. 2;

FIG. 4 is a plan view according to FIG. 1 showing the leveling device with a top wall shown partially cut-away to view details of the leveling device within the frame in a nominal position of adjustment;

FIG. 5 is a plan view according to FIG. 4 showing the leveling device in a first extreme position of adjustment; and FIG. 6 is a plan view according to FIG. 4 showing the leveling device in a second extreme position of adjustment.

DETAILED DESCRIPTION OF THE INVENTION

The present invention is a surface orientation sensing device as shown in FIG. 1. A leveling frame 10 is preferably constructed as an extruded structural box cylinder. The frame 10 provides a rigid plate means 11, preferably a pair of rigid plates 12 and 14 (FIG. 2) forming opposing sides of the box cylinder, the plates being in spaced-apart, fixed positions as the box cylinder is a rigid body.

The plate means 11 can alternately be a single plate or other possibilities which are in accordance with the meaning of the present structure. The plates 12 and 14, each have a cam hole 16A and 16B formed through the plates 12 and 14 respectively, the cam holes being mutually concentric in opposing positions as best seen in FIG. 2. Adjacent to the cam holes 16A, B is an aperture means 18 for viewing a leveling vial 20. The aperture means 18 comprises a single viewing hole in one of the plates as shown in FIG. 1, or a pair of such viewing holes, one in each of the plates in opposing positions so the vial 20 may be viewed from the top or from the bottom of the frame 10 as best seen in FIG. 2. In FIG. 1 the viewing hole is round, but such viewing holes may be any shape or size as may allow viewing of the leveling vial 20. The leveling vial 20 is shown in FIG. 1 in a position where the vial 20 might be used for determining if a surface of a vertical beam, for instance, is plumb. The leveling vial 20 may also be positioned, within the leveling frame 10, at 90 degrees with respect to the position shown in FIG. 1 so that the present device might be used to determine if a beam surface is in a horizontal or level condition. The leveling frame 10, may in general, have more than one vial 20 so as to be used alternately for either of these applications.

Within the leveling frame 10, a vial assembly 30 provides, a vial holder body 40 engaging the leveling vial 20 within it. The holder body 40 further has a pivoting means 50. The pivoting means 50 is preferably a single ridge 50A which is formed integrally with the vial holder body 40, or the pivoting means 50 may be a pair of side-by-side, parallel ridges 50A and 50B, integral with the vial holder body 40 as shown in FIGS. 4–6. In these figures, the ridges 50A and 50B are positioned on the side surface 40 S of the vial holder body 40 and extend linearly into the plane of FIGS. 4–6.

Please note that the vial holder body 40 is of such size and shape as to be easily and quickly inserted into the leveling frame 10 from one of the frame's open ends, without tools. Note also, that the vial holder body 40 is a symmetrical part so that it may be inserted into the body 40 with either of its two major side surfaces facing upwardly. A biasing means 60 communicates with the leveling frame 10 for directionally urging the pivoting means 50 into communication with the leveling frame 10, i.e., placing it in contact with the side wall 72. The biasing means 60 preferably comprises an elongate finger 62 integral with and extending from the vial holder body 40, the finger supporting a coil spring 64 as shown in FIGS. 4–6. In this embodiment, the spring 64 is always in a state of compression so that it urges the vial holder body 40 away from the side wall 70 and toward the side wall 72. In this way, one or both of the ridges 50A, 50B are always in contact with side wall 72. When pivoting means 50 includes two ridges as shown in FIGS. 4–6, it is clear that the ridges complement each other, in that each takes part of the load induced by the bias means 60 thereby reducing the effects of material creep, stress induced strain, elastic flow of the materials of construction and other effects. This enables the invention to have a longer life and maintain greater accuracy in alignment over that life.

An elongate cam pin 80 provides a rotational support means 80A and 80B for engaging the cam holes 16A and 16B respectively in plates 12 and 14. The rotational support means 80A,B preferably fit tightly into their respective cam holes 16A,B and are able to rotate but with a certain amount of frictional interference or drag so that the cam pin is not easily rotated unintentionally. In this way rotation by purposeful effort is achieved but not inadvertent rotation. A camming surface 80C is adapted by its size for frictional rotational engagement within a cam pin engagement hole 42 in the vial holder body 40. The camming surface 80C is eccentrically located with respect to the rotational support means 80A,B and therefore, also with respect to the cam holes 16A,B. This is best seen in FIG. 2. A tool engagement means 82, such as a hexagonal wrench socket, as shown in FIG. 1, is formed in the cam pin 80 for rotating the cam pin 80 in the cam holes 16A,B and therefore also in the cam pin engagement hole 42. As the cam pin 80 rotates, the vial holder body 40 moves eccentrically with it. The rotational support means 80B is shown in FIGS. 4–6 by a circle with hidden lines since it is below the cam pin 80 in these figures. Notice that the support means 80B takes different positions relative to the engagement hole 42 depending upon the rotational position of the cam pin 80. Notice also that the vial holder body 40, and so also the vial 20 itself takes various positions, i.e., changes position with rotation of the cam pin 80. In this way, the vial 20 is able to adjust for any loss of correspondence between the vial 20 and the leveling frame 10 due to temperature changes, strains set up from rough handling or other causes. Therefore with rotation of the cam pin 80, the vial assembly 30 is movable for aligning the leveling vial 10 with the leveling frame 10. In the figures it is seen that the axis of rotation of the cam pin 80 is aligned, that is, parallel, with the axis of the aperture means 18. Preferably, the cam pin 80 and the engagement hole 42 together provide a detent means 80D so as to enable the vial holder body 40 to sit within the leveling frame 10 in a preferred position, i.e. centrally. The detent means 80D, as shown in FIG. 2, is formed preferably as an annular groove in the cam pin 80 and a corresponding annular ridge in the vial holder body 40, but any other detent means serving the same purpose may be employed to the same advantage.

While the invention has been described with reference to a preferred embodiment, it is to be clearly understood by those skilled in the art that the invention is not limited thereto. Thus the scope of the invention is to be interpreted only in conjunction with the appended claims.

What is claimed is:

1. A level sensing device comprising:
    a leveling frame providing a pair of rigid plates in spaced-apart, fixed positions, the plates each having a cam hole therein, the cam holes being mutually concentric, and adjacent the cam holes, an aperture means for viewing a leveling vial;
    within the leveling frame, a vial assembly providing, a vial holder body engaging the leveling vial therein, the vial holder body further having a pivoting means thereon, a biasing means communicating with the leveling frame for directionally urging the pivoting means into communication with the leveling frame, and a cam pin engagement hole;
    an elongate cam pin providing rotational support means for engaging the cam holes, a camming surface adapted for rotational engagement within the cam pin engagement hole, and a tool engagement means for rotating the cam pin in the cam holes and the cam pin engagement hole;
    whereby with rotation of the cam pin, the vial assembly is movable for aligning the leveling vial with the leveling frame.

2. The device of claim 1 wherein an axis of rotation of the cam pin is aligned with an axis of the aperture means.

3. The device of claim 1 wherein the pivoting means is a single ridge integral with the vial holder body.

4. The device of claim 1 wherein the pivoting means is a pair of side-by-side, parallel ridges integral with the vial holder body.

5. The device of claim 1 wherein the biasing means is an elongate finger integral with and extending from the vial holder body, the finger supporting a coil spring thereon.

6. The device of claim 1 wherein the cam pin and the engagement hole together provide a detent means so as to enable the vial holder body to sit with the leveling frame in a preferred position.

7. The device of claim 6 wherein the detent means is formed as an annular groove in the cam pin, corresponding with an annular ridge in the vial holder body.

8. A level sensing device comprising:
    a leveling frame providing a rigid plate means, the plate means having at least one cam hole therein, and adjacent the cam hole, an aperture means for viewing a leveling vial;
    engaged with the plate means, a vial assembly providing, a vial holder body engaging a leveling vial therein, the vial holder body further having a pivoting means thereon, a biasing means communicating with the leveling frame for directionally urging the pivoting means into communication with the leveling frame, and a cam pin engagement hole;
    an elongate cam pin providing rotational support means for engaging the cam hole, a camming surface adapted for rotational engagement within the cam pin engagement hole, and a tool engagement means for rotating the cam pin in the cam hole and the cam pin engagement hole;
    whereby with rotation of the cam pin, the vial assembly is movable for aligning the leveling vial with the leveling frame.

9. The device of claim 8 wherein an axis of rotation of the cam pin is aligned with an axis of the aperture means.

10. The device of claim 8 wherein the pivoting means is a single ridge integral with the vial holder body.

11. The device of claim 8 wherein the pivoting means is a pair of side-by-side, parallel ridges integral with the vial holder body.

12. The device of claim 8 wherein the biasing means is an elongate finger integral with and extending from the vial holder body, the finger supporting a coil spring thereon.

13. The device of claim 8 wherein the cam pin and the engagement hole together provide a detent means so as to enable the vial holder body to sit within the leveling frame in a preferred position.

14. The device of claim 13 wherein the detent means is formed as an annular groove in the cam pin, corresponding with an annular ridge in the vial holder body.

* * * * *